(12) United States Patent
Cameron et al.

(10) Patent No.: US 11,050,858 B2
(45) Date of Patent: Jun. 29, 2021

(54) PROGRAMMABLE DATA ROUTER

(71) Applicant: Autodesk, Inc., San Rafael, CA (US)

(72) Inventors: Joshua Cameron, Ontario (CA); Alexander Tessier, Ontario (CA)

(73) Assignee: AUTODESK, INC., San Rafael, CA (US)

(*) Notice: Subject to any disclaimer, the term of this patent is extended or adjusted under 35 U.S.C. 154(b) by 209 days.

(21) Appl. No.: 15/016,175

(22) Filed: Feb. 4, 2016

(65) Prior Publication Data

US 2017/0230487 A1 Aug. 10, 2017

(51) Int. Cl.
*H04L 29/06* (2006.01)
*H04L 12/24* (2006.01)
*H04L 29/08* (2006.01)

(52) U.S. Cl.
CPC ............. *H04L 69/18* (2013.01); *H04L 41/08* (2013.01); *H04L 67/125* (2013.01); *H04L 69/08* (2013.01); *H04L 41/082* (2013.01)

(58) Field of Classification Search
CPC ..... H04L 69/18; H04L 12/2803; H04L 41/08; H04L 41/082; H04L 67/125; H04L 69/08
See application file for complete search history.

(56) References Cited

U.S. PATENT DOCUMENTS

| | | | | |
|---|---|---|---|---|
| 6,370,569 B1* | 4/2002 | Austin | ............ | H04L 29/06 709/217 |
| 2002/0103877 A1* | 8/2002 | Gagnon | ............ | H04L 63/08 709/217 |
| 2004/0267449 A1* | 12/2004 | Adamczyk | ......... | G01C 21/3438 701/410 |
| 2006/0200515 A1* | 9/2006 | Cousins | ............ | H04L 67/327 709/201 |
| 2008/0056369 A1* | 3/2008 | Seto | ............ | H04N 19/61 375/240.16 |
| 2013/0138830 A1* | 5/2013 | Fang | ............ | H04L 47/263 709/233 |
| 2014/0019993 A1* | 1/2014 | Mathur | ............ | G06F 9/54 719/313 |
| 2014/0164539 A1* | 6/2014 | Mastrangelo | ............ | H04L 65/40 709/206 |
| 2014/0282453 A1* | 9/2014 | O'Rourke | ............ | G06F 8/41 717/154 |
| 2017/0187835 A1* | 6/2017 | Lim | ............ | H04L 67/16 |

OTHER PUBLICATIONS

Freer, Computer Communications and Networks; John Freer, Plenum Press, New York, Library of Congress Catalog Card No. 88-042815, 1988. (Year: 1988).*

(Continued)

*Primary Examiner* — Zhensheng Zhang
(74) *Attorney, Agent, or Firm* — Artegis Law Group, LLP

(57) ABSTRACT

A method for managing a device network includes determining that first data received from a first network device is associated with a first communications interface protocol. The method further includes retrieving a first software plug-in associated with the first communications interface protocol, and modifying the first data via the first software plug-in to generate first modified data. The method further includes performing a first operation associated with a second network device based on the first modified data, where the second network device is associated with a second communications interface protocol.

18 Claims, 8 Drawing Sheets

(56) References Cited

OTHER PUBLICATIONS

"Arrayent", 2 pages, http://www.arrayent.com.
"Internet of Things", 8 pages, http://www.ptc.com/axeda/internet-of-things.
"Axeda Machine Cloud", http://www.axeda.com/system/files/.../axeda_ds_agents_110713_lores.pdf.
"Smarter Products Come with Better Apps", 7 pages, https://evrythng.com/solutions/connected-devices/.
"Mbed Device Connector", 3 pages, http://mbed.com/technology/device-server/.
"Nimbits platform", 4 pages, http://www.nimbits.com/index.jsp.

\* cited by examiner

PROGRAMMABLE DATA ROUTER

BACKGROUND OF THE INVENTION

Field of the Invention

The present invention relates generally to networking and, more specifically, to a programmable data router.

Description of the Related Art

The Internet of Things (IoT) refers to a network of physical devices that are embedded with electronics and software and which are capable of relating to the physical world, such as via sensors and actuators. Each device is uniquely identifiable via embedded coding and is able to interoperate with the existing Internet infrastructure. Additionally, devices may have the capacity to monitor and/or control a feature or parameter in a particular environment.

Many IoT devices are currently available for monitoring and/or controlling parameters in a wide variety of applications. For example, devices exist to set home thermostats, turn on stoves, and monitor temperatures in refrigerators. Other devices may lock or unlock doors, turn lighting on or off, or remotely start or disable vehicles. Additionally, IoT techniques may be implemented to control machinery in factory environments.

Frequently, however, various devices cannot interoperate due to incompatible communications interfaces implemented by the devices. For example, a device may include a proprietary interface that is incompatible with the interfaces implemented by other devices. Further, the ability to converge to a single, common interface may be hampered by the tendency of consumers to consider criteria other than a device's communications interface when selecting a device. For example, a user may select a device based on the perceived quality and/or appearance of the device, and not based on the type of communications interface implemented by the device. Consequently, users may end up with multiple devices that include incompatible communications interfaces. Further, devices may not be capable of connecting to the Internet.

As the foregoing illustrates, what is needed in the art is a more effective technique for establishing connectivity among devices that have incompatible communications interfaces.

SUMMARY OF THE INVENTION

One embodiment of the invention sets forth a method for managing a device network. The method includes determining that first data received from a first network device is associated with a first communications interface protocol and selecting a first software plug-in associated with the first communications interface protocol. The method further includes modifying the first data via the first software plug-in to generate first modified data and performing a first operation associated with a second network device based on the first modified data, where the second network device is associated with a second communications interface protocol.

Further embodiments provide, among other things, a non-transitory computer-readable medium and a system configured to implement the method set forth above.

One advantage of the disclosed techniques is that connectivity can be established between an array of devices having incompatible communications interfaces. Further, the disclosed techniques enable connectivity to be expanded to support future communications interfaces that may be implemented on new devices and technologies. Additionally, the disclosed techniques allow devices without a native communications interface to be integrated into a larger system, leading to a wider spectrum of available devices.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
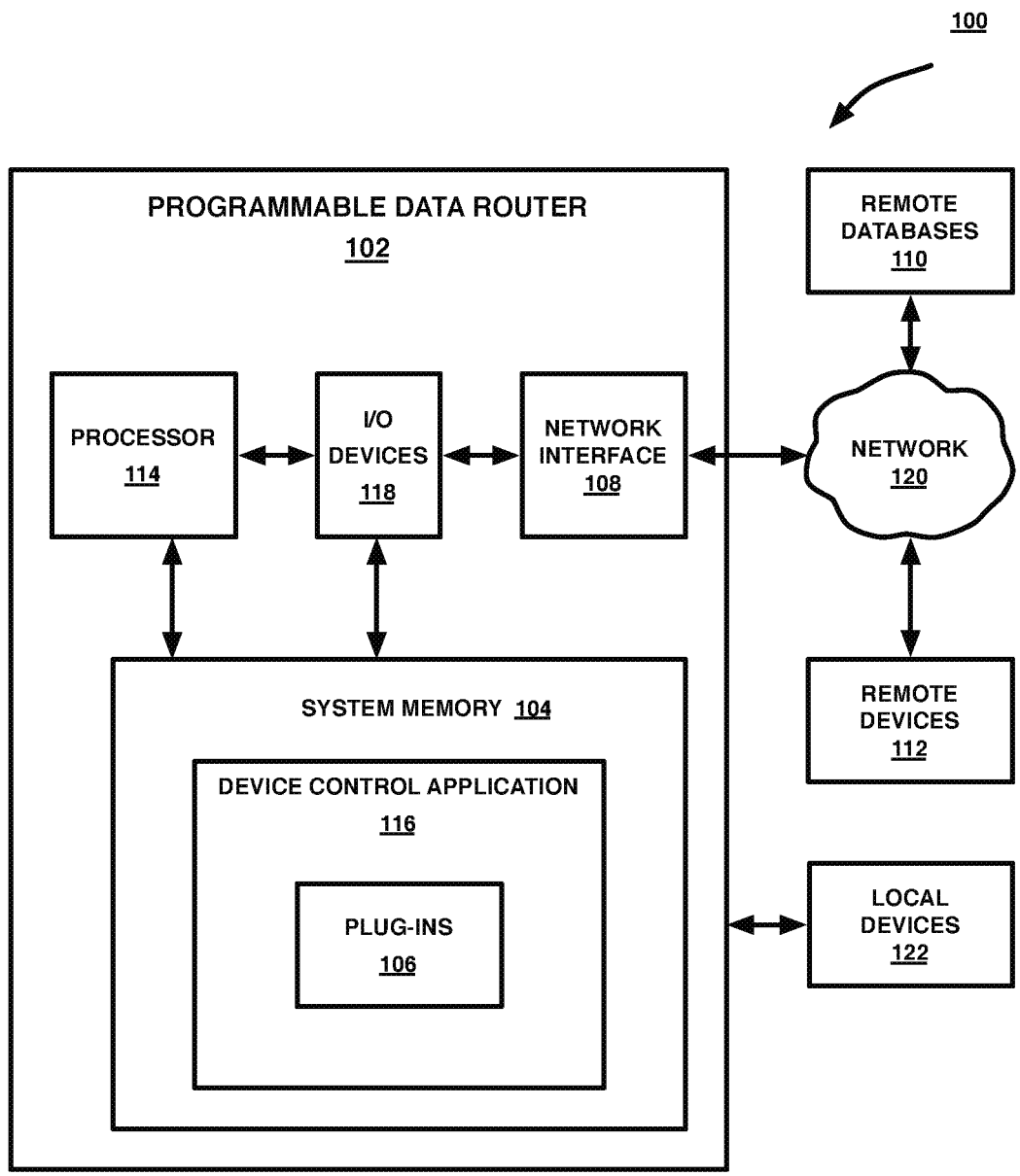
FIG. 1 illustrates a device network configured to implement one or more aspects of the present invention.

FIG. 1 illustrates a device network 100 configured to implement one or more aspects of the present invention. As shown, device network 100 includes programmable data router 102, network 120, remote databases 110, remote devices 112, and local devices 122. Programmable data router 102 may be a workstation, a laptop computer, a tablet or handheld device, or any other device capable of implementing the control functions as discussed below in further detail in conjunction with FIGS. 2-8.

Programmable data router 102 includes processor 114, input/output (I/O) devices 118, and system memory 104. System memory 104 includes device control application 116 which further includes plug-ins 106. Processor 114 may be any technically feasible form of processing device configured to process data and execute program code. Processor 114 could include, for example, a central processing unit (CPU), a graphics processing unit (GPU), an application-specific integrated circuit (ASIC), a field-programmable gate array (FPGA), and so forth.

Programmable data router 102 communicates with remote databases 110, remote devices 112, and local devices 122 via network interface 108. Network interface 108 may implement a variety of wired and wireless communications protocols that enable interface with local devices 122, remote devices 112 and remote databases 110 via network 120. Wired interface protocols may include, for example, USB, RS232, RS485, and Modbus. Wireless interface protocols may include, for example, CDMA, GSM, Bluetooth, WiFi, ZigBee, and Z-Wave. Remote databases 110 and remote devices 112 are utilities that are typically accessed via a wide area network (WAN). Local devices 122 are utilities that are typically accessed via a local area network (LAN).

I/O devices 118 are configured to receive input data from network interface 108 and transmit the input data to processor 114. I/O devices 118 may include one or more buttons, a keyboard, a mouse, and/or other input devices. The I/O devices 118 are further configured to receive output data from processor 114 and transmit the output data to network interface 108.

In general, device control application 116 is a software application that enables connectivity to be provided between an array of disparate data sources, devices, and/or networks. Programmable data router 102 may connect to remote databases 110, remote devices 112, or local devices by interpreting data received via a variety of different communications interfaces and/or by converting data based on a common communications interface protocol, also referred to as a canonical format. Further, programmable data router 102 may be capable of learning new communications interface protocols to accommodate future expansion. Based on such capabilities, programmable data router 102 may send and/or receive data in order to monitor and control a wide variety of devices in one or more environments.

Various manufacturers may implement devices having communications interfaces that differ from other devices, such as the remote devices 112 or local devices 122 shown in FIG. 1. Similarly, remote databases 110 may include one or more individual databases that are accessed via different communications interfaces. Thus, the device network 100 may include a collection of devices and databases having incompatible communications interfaces.

One example of a specific environment is a home having one or more local devices 122 that are configured to control various aspects of the home. Such local devices 122 may include, without limitation, thermostats, lighting, air conditioning, and home appliances, such as stoves and refrigerators. Device control application 116 communicates with devices included in the environment via plug-ins 106 that translate data received from and transmitted to each device included in local devices 122. For example, a thermostat may have a communications interface that is different than the communications interface associated with a home lighting controller. Accordingly, device control application 116 may retrieve and implement a thermostat interface plug-in and/or a home lighting controller plug-in to translate data to a common format, enabling the device control application 116 to communicate with multiple local devices 122 having incompatible communications interfaces. Various types of plug-ins 106 that may be implemented by the programmable data router 102 are described below in further detail in conjunction with FIGS. 2-8.

Another example of a specific environment is an office building with a number of devices or subsystems included in remote devices 112 and/or local devices 122 configured to control various aspects of building activity or maintenance. Devices or subsystems may include, without limitation, subsystems to monitor building access, lighting, heating, ventilation and air conditioning (HVAC), and occupancy. Yet another example of a specific environment may include a factory floor with a number of devices or subsystems included in remote devices 112 and/or local devices 122 configured to control various aspects of factory activity. Devices or subsystems may include, without limitation, subsystems to monitor machine operation, inventory, and work in process.

Various devices, such as those included in the environments described above, may be incompatible with one another because the devices may include different communications interface protocols. For example, many devices include a proprietary communications interface that is specific to a particular manufacturer. Further, devices may not be capable of controlling or monitoring specific types of environments in a manner desired by a user. As an example, a device included in local devices 122, such as a refrigerator, may not include a temperature measurement capability that a user would like to implement in a device network 100 included in a home environment. Accordingly, device control application 116 may download a unique plug-in for an after-market temperature measurement device that may be implemented with the refrigerator. Thus, in the above example, programmable data router 102 enables a user to implement a temperature measurement device with a refrigerator that previously was unable to communicate with the device network 100.

Device control application 116, when executed by processor 114, provides connectivity to various devices included in remote devices 112 and/or local devices 122 via one or more plug-ins 106. Remote devices 112 and local devices 122 may include devices such as sensors, transducers, actuators, etc. that monitor and/or control aspects of a specific environment. Further, device control application 116, when executed by processor 114, provides connectivity to remote databases 110 to enable the programmable data router 102 to retrieve and store data. Thus, device control application 116, when executed by processor 114, integrates various devices and databases included in the device network 100 in order to provide more efficient control and monitoring of a specific environment.

Device control application 116 translates various manufacturers communications protocols to a common protocol, and renders the functionality of device control application 116 independent of device manufacturer. By implementing a common protocol, device control application 116 eliminates the "tower of Babel" that can result from integrating multiple devices from disparate manufacturers. Further, devices need a base level of communication that is often minimal, for example, a request for a temperature data point. Device control application 116 may include logic that analyzes all requirements and determines a least common denominator to derive most efficient operation. Device control application 116 may be implemented to operate on any type of platform that is capable of computer processing, for example, smartphone, Raspberry Pi®, Arduino®, microcontroller, and the like.

Device network 100 includes network data that characterize a variety of physical parameters associated with device network 100. Network data may include physical parameters that may be monitored and/or controlled may include temperature, voltage levels, power usage, building entrance and egress, building occupancy status, factory production workflow or machine status.

Figure 2:
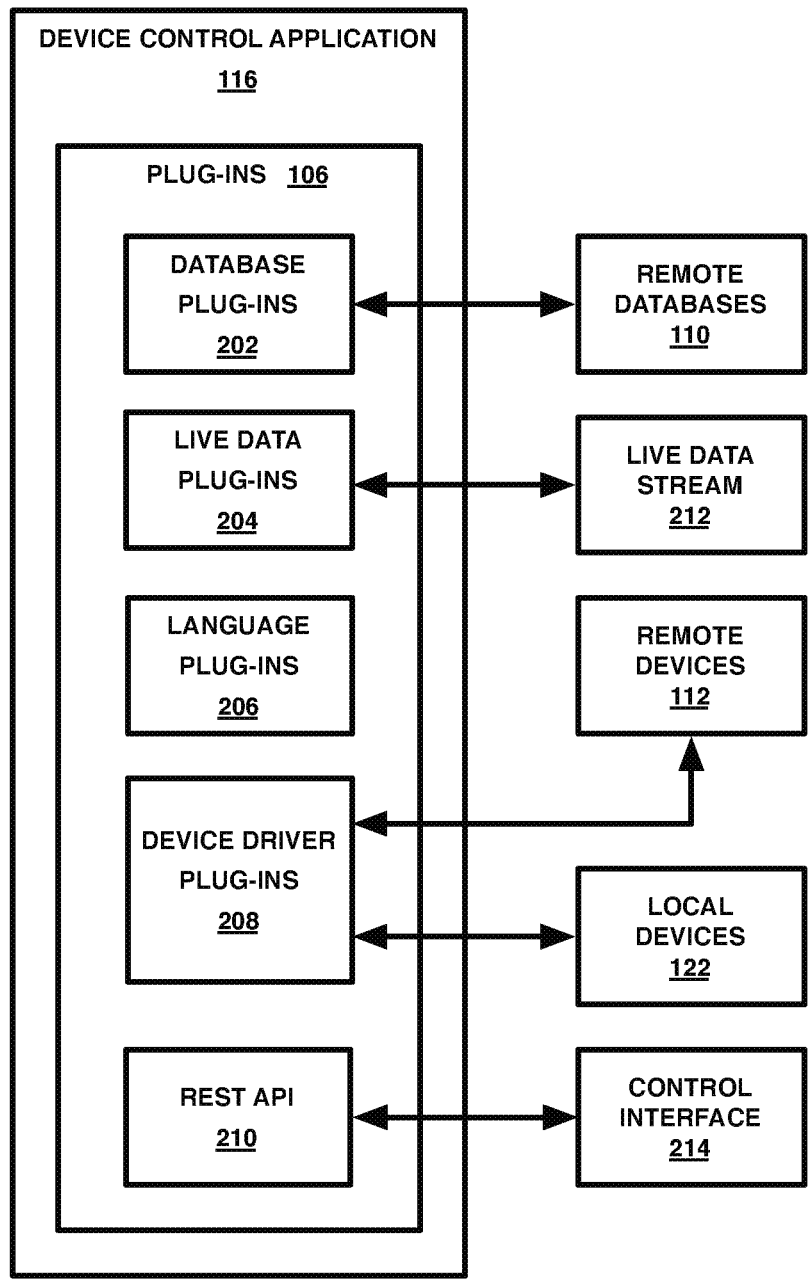
FIG. 2 is a block diagram of a device control application and plug-ins that may be implemented in conjunction with the device network of FIG. 1, according to various embodiments of the present invention.

FIG. 2 is a block diagram of a device control application 116 and plug-ins 106 that may be implemented in conjunction with the device network 100 of FIG. 1, according to various embodiments of the present invention. As shown, plug-ins 106 includes database plug-ins 202, live data plug-ins 204, language plug-ins 206, device driver plug-ins 208, and representational state transfer (REST) application program interface (API) 210. As further shown, database plug-ins 202 are coupled to remote databases 110, live data plug-ins 204 are coupled to live data stream 212, and REST API 210 is coupled to control interface 214. Device control application 116 may couple to remote devices 112 and/or local devices 122.

In general, plug-ins 106 may include specialized software components that are appended to and/or communicate with higher level software components to provide expanded functionality. Database plug-ins 202 are software components that enable device control application 116 to interact with various types of remote databases 110. Live data plug-ins 204 enable device control application 116 to receive, process, and/or display data associated with one or more live data streams 212. Live data streams 212 may include, for example, continuous temperature readings, instantaneous power usage within a home or a building, stock market quotes, or any form of data that varies in real-time. Additionally, other types of plug-ins 106 may be implemented in the various embodiments.

Language plug-ins 206 enable device control application 116 to interpret software coded in a variety of computer programming languages. Language plug-ins 206 include programming and compiling functionality that is compatible with various computer languages, as described below in conjunction with FIG. 5. Device driver plug-ins 208 include computer programs that operate or control particular types of devices included in the network by implementing a software interface to hardware components that may be included in remote devices 112 and local devices 122. As described above in conjunction with FIG. 1, remote devices 112 and local devices 122 may include any number of devices configured to control parameters and/or equipment included in the specific environment.

REST API 210 includes a set of routines that implement a stateless client-server interface, typically via the Hypertext Transfer Protocol (HTTP). In some embodiments, a control interface 214 communicates with the programmable data router 102 via REST API 210 to enable a user to interact with device control application 116 to control and/or monitor the device network 100.

Figure 3:
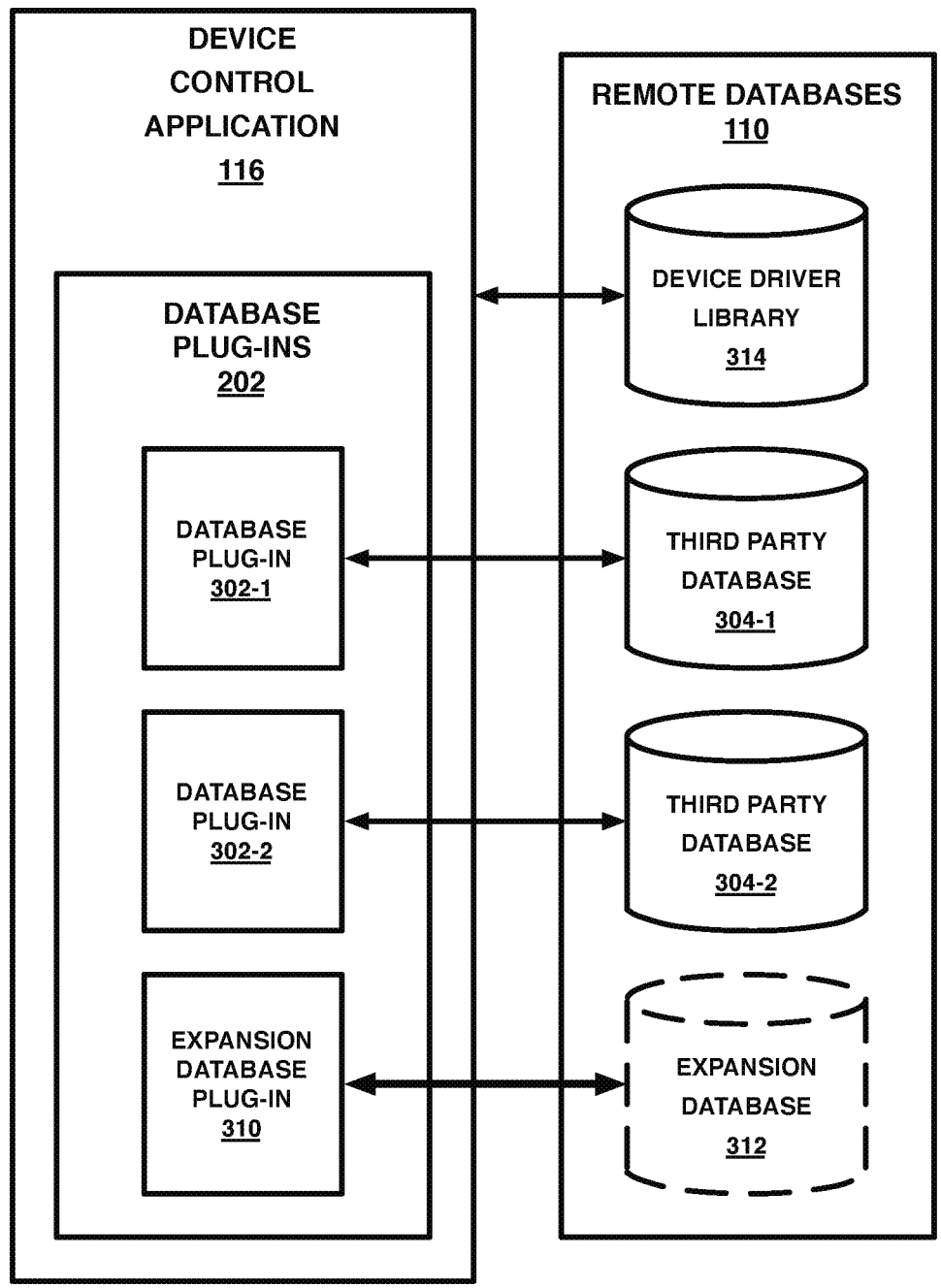
FIG. 3 is a block diagram of database plug-ins that may be implemented by the programmable data router of FIG. 1, according to various embodiments of the present invention.

FIG. 3 is a block diagram of database plug-ins 202 that may be implemented by the programmable data router 102 of FIG. 1, according to various embodiments of the present invention. As shown, database plug-ins 202 interface with remote databases 110. Database plug-ins 202 may include database plug-in 302-1, database plug-in 302-2, and expansion database plug-in 310. Further, remote databases 110 also may include device driver library 314, third party database 304-1, third party database 304-2, and expansion database 312. Database plug-in 302-1 is coupled to third party database 304-1. Database plug-in 302-2 is coupled to third party database 304-2.

Third party database 304-1 stores data in a first format, such as a proprietary format. Database plug-in 302-1 is a software element that receives data in the format provided by third party database 304-1 and converts the received data into a format compatible with device control application 116. Thus, device control application 116 retrieves data for local processing and/or for transmitting to remote storage and/or processing. For example, third party database 304-1 may include a commercially available database that stores time series data (e.g., Folio, Cassandra, etc.). Database plug-in 302-2 is a software element that interfaces with third party database 304-2 to retrieve data for local processing and/or to transmit data for remote storage and/or processing. Although two remote databases 110 are shown in FIG. 3, in various embodiments, the remote databases 110 may include any number of databases, each of which may implement a different plug-in included in database plug-ins 202.

Device driver library 314 is a database that includes drivers for various remote devices 112 and/or local devices 122 that may be integrated with device network 100. Device driver library 314 is coupled to device control application 116, enabling device control application 116 to download device drivers, for example, when additional remote devices 112 and/or local devices 122 are to be integrated with the device network 100.

Expansion database plug-in 310 is an example of a plug-in that enables the device control application 116 to integrate future devices having new features and capabilities. Further, expansion database 312 represents future database(s), networks, etc. that may be integrated into the device network 100 at some future time. Accordingly, arbitrary plug-ins may be integrated with the programmable data router 102 as various interfaces and protocols are created, modified, and updated.

Figure 4:
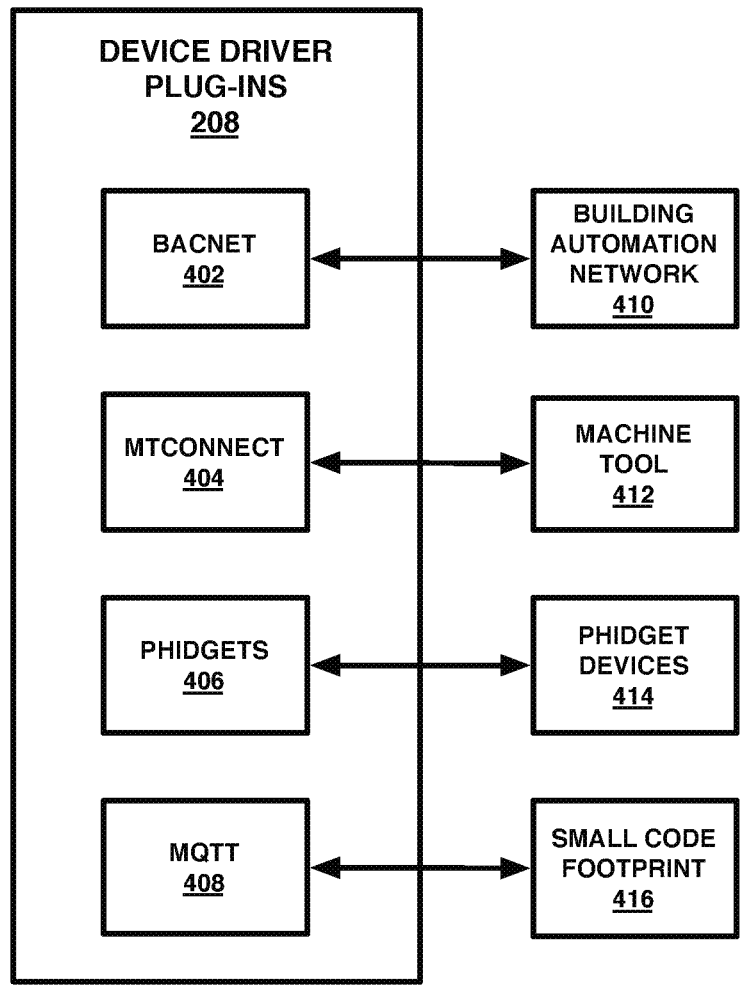
FIG. 4 is a block diagram of device driver plug-ins that may be implemented by the programmable data router of FIG. 1, according to various embodiments of the present invention.

FIG. 4 is a block diagram of device driver plug-ins 208 that may be implemented by the programmable data router 102 of FIG. 1, according to various embodiments of the present invention. As shown, device driver plug-ins 208 include BACnet 402, MTConnect 404, phidgets (physical widgets) 406, and MQTT 408. As further shown, BACnet 402 is coupled to building automation network 410. MTConnect 404 is coupled to machine tool 412. Phidgets 406 is coupled to phidget devices 414, and MQTT 408 is coupled to small code footprint 416.

In general, device driver plug-ins 208 include one or more plug-ins that implement different communications protocols to allow device control application 116 to communicate with a variety of software applications such as building automation network 410, machine tool 412, and the like, as described above. Device driver plug-ins 208 may access plug-ins included in device driver plug-ins 208 in order to monitor and/or control network data. Device control application 116 supports expanding device network 100 by configuring device network 100 with additional devices. Device control application 116 may retrieve, via network 120, additional plug-ins to support additional devices.

BACnet 402 is a software element that implements a communications protocol for building automation and control networks. BACnet is designed to support interface with heating, ventilation, and air conditioning (HVAC) control systems, lighting, and access control systems that may reside within building automation network 410. Device control application 116 may invoke BACnet 402 to communicate with any number of devices included in building automation network 410. BACnet 402 receives command data from device control application 116 and translates or converts the command data into a format that is accessible by building automation network 410. BACnet 402 further receives status and response data from building automation network 410 and converts the status and response data into the canonical format of device control application 116.

MTConnect 404 is a manufacturing industry standard to monitor and control process information associated with numerically controlled machine tools. The MTConnect 404 plug-in couples to machine tool 412. Machine tool 412 may include a single tool, an array of common tools, or any number of different types of machine tools or factory automation hardware that may reside in a manufacturing facility. Device control application 116 may invoke MTConnect 404 to communicate with any number of devices associated with machine tool 412.

Phidgets 406 is a software element that interfaces with phidget devices 414. Phidget devices 414 are a system of low cost electronic components and sensors that may be controlled by a computer. Phidget devices 414 are physical analogs of software widgets and allow implementation of a complex system using low level, simple elements. Phidgets 406 may couple to any number of devices included in phidget devices 414.

MQTT 408 is a software element that supports MQTT (formerly MQ telemetry transport) messaging protocol that operates over TCP/IP protocols and is designed for a small code footprint. Several commercial entities utilize small code footprint capabilities including Facebook, EVRYTHNG IoT platform, and Amazon IoT. Device control application 116 may invoke MQTT 408 to communicate with any number of devices included in small code footprint 416.

Figure 5:
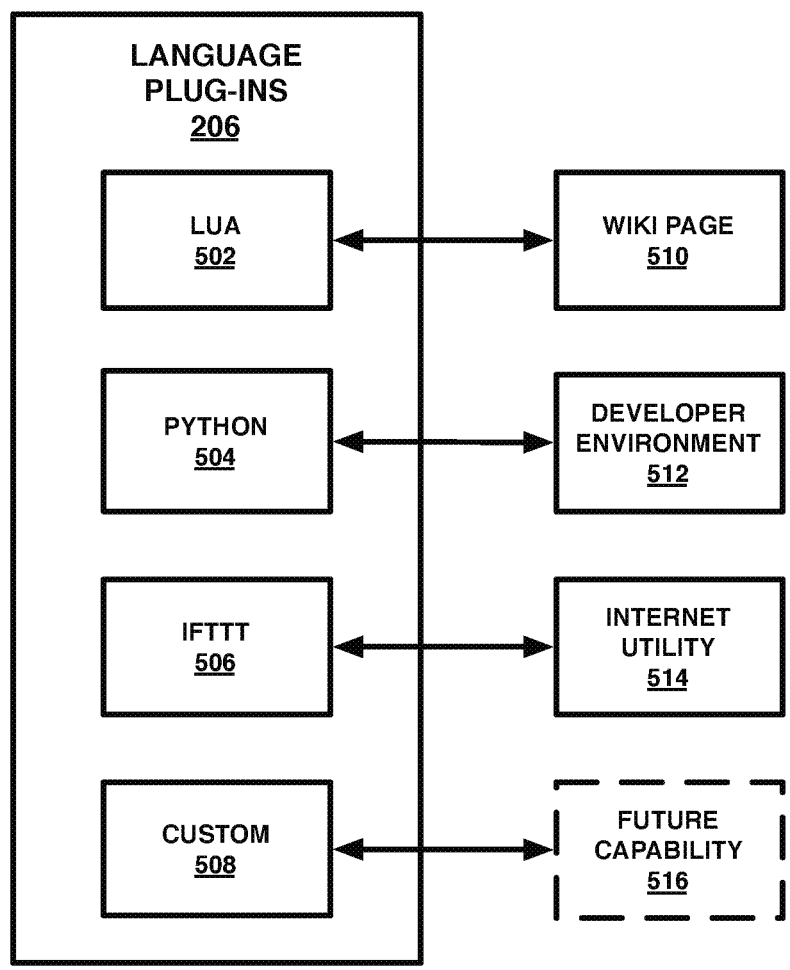
FIG. 5 is a block diagram of language plug-ins that may be implemented by the programmable data router of FIG. 1, according to various embodiments of the present invention.

FIG. 5 is a block diagram of language plug-ins 206 that may be implemented by the programmable data router 102 of FIG. 1, according to various embodiments of the present invention. In various embodiments, a language plug-in 206 provides an environment in which programs written in a particular programming language can be run, enabling such programs to interface with devices and/or programs written in other programming languages. In some embodiments, the language plug-ins 206 enable algorithms written in different programming languages to work with data in a single canonical format. A language plug-in 206 may further expose device parameters to programs written in a particular programming language, for example, by allowing the programs to read and write parameters of devices connected to the programmable data router 102. In addition, a language plug-in 206 may allow subscribers to interact with programs written in a particular programming language, for example, by enabling subscribed devices to create/read/update/delete subscriptions to control how data (e.g., device readings) are routed to other software entities, such as databases.

As shown, language plug-ins 206 includes LUA 502, python 504, IFTTT 506, and custom 508. LUA 502 is coupled to wikipage 510. Python 504 is coupled to developer environment 512. IFTTT 506 is coupled to Internet utility 514. Custom 508 is coupled to future capability 516, which may include software programs that may be written in any number of computer programming languages, for example, Ruby, Prolog, Io, Haskell, Erlang, and the like. In such embodiments, custom 508 could enable a user to implement algorithms in a programming language with which they are familiar and/or enable a user to make use of existing libraries written in the programming language.

In expanding device network 100, as described above in conjunction with FIG. 4, device control application 116 may retrieve software elements or additional plug-ins that include programs that may be coded in a variety of programming languages. Language plug-ins 206 may receive programs in a specific programming language and provide an environment in which the programs can be executed.

LUA 502 is a plug-in to receive, process, and execute programs coded in LUA, which is a language designed primarily for embedded systems to facilitate customization. Python 504 is a plug-in to receive, process, and execute programs coded in Python, which is a widely used general-purpose high-level programming language.

IFTTT 506 is a plug-in that may receive, process, and execute programs that communicate with the IFTTT (if this then that) web-based service or a similar type of service. Such web-based services allow a user to create a chain of conditional statements to interact with devices connected to a cloud-based networking service. For example, IFTTT 506 (or a similar plug-in 206) could communicate with a cloud-based networking service by transmitting device readings to the service, receiving directions and/or device readings from the service, and/or performing conditional actions based on those readings.

Custom 508 is a plug-in that may receive, process, and execute programs coded in languages that may be implemented due to future expansion by interface with future capability 516. Future capability 516 may include software programs written in any number of computer programming languages, for example, Ruby, Prolog, Io, Haskell, Erlang, and the like.

Figure 6:
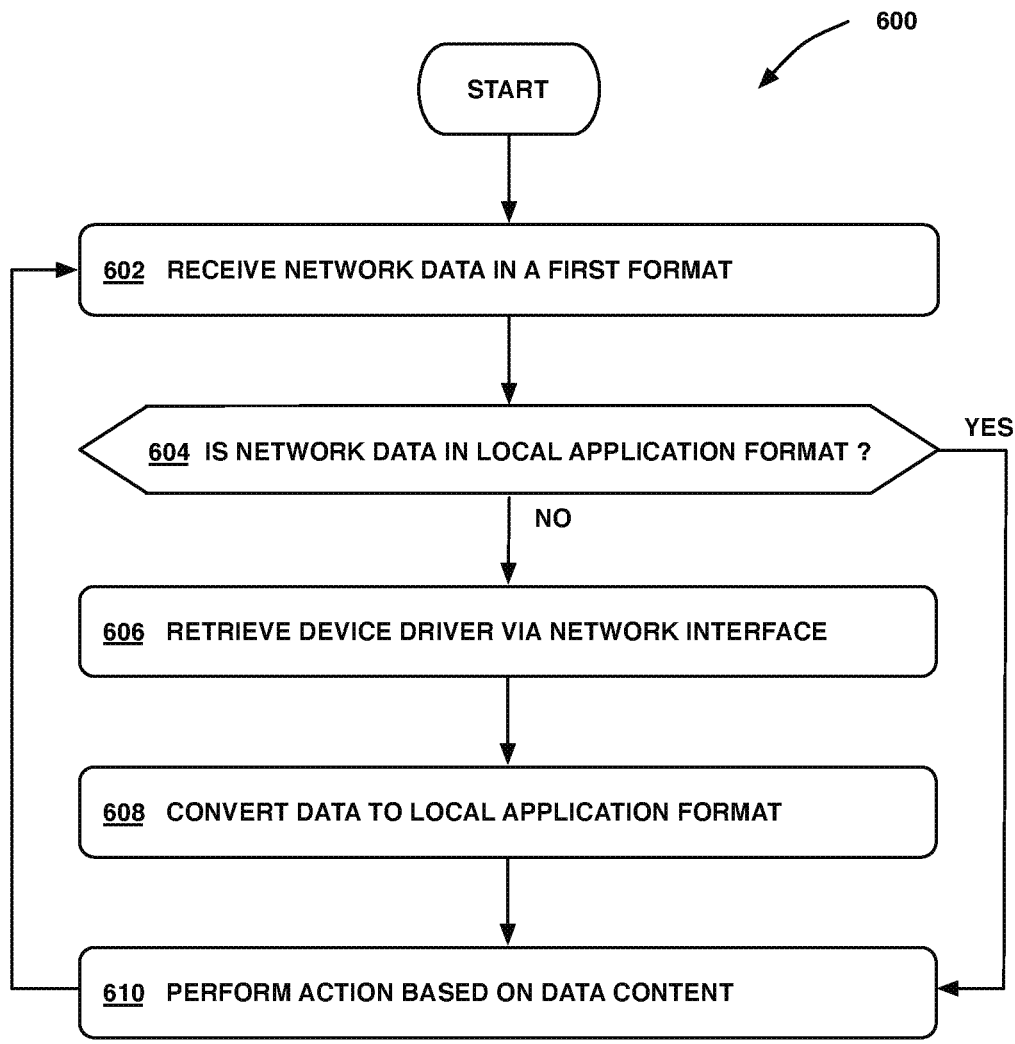
FIG. 6 is a flow diagram of method steps for controlling and monitoring an environment, according to various embodiments of the present invention.

FIG. 6 is a flow diagram of method steps for controlling and monitoring an environment, according to various embodiments of the present invention. Although the method steps are described in conjunction with the systems of FIGS. 1-5, persons skilled in the art will understand that any system configured to perform the method steps, in any order, is within the scope of the present invention.

As shown, method 600 begins at step 602 where device control application 116, when executed by processor 114, receives network data in a first format. Network data may include parameters, such as temperature, voltage levels, power usage, building entrance and egress, building occupancy status, factory production workflow or machine status, as described above. Network data may be associated with device driver plug-ins 208 and may be stored in system memory 104. In some embodiments, incoming data is validated and authenticated in order to determine whether the data was received from a trusted source.

At step 604, device control application 116 determines if the received network data is in a format that is compatible with the format of device control application 116. If, at step 604, device control application 116 determines that the received network data is in a format that is compatible with the format of device control application 116, then method 600 proceeds to step 610. For example, in some embodiments, a user may explicitly install a plug-in 106 to allow the programmable data router 102 to communicate with a particular class of devices. Then, once the plug-in 106 (e.g., device driver plug-in 208) is installed, the programmable data router 102 can retrieve the plug-in 106 in order to receive and interpret data from the class of devices.

If, at step 604, device control application 116 determines that the received network data is not in a format that is compatible with the format of device control application 116, then method 600 proceeds to step 606. At step 606, device control application 116 retrieves, via network 120 or system memory 104, a device driver that is compatible with the format of the received network data. Device control application 116 may retrieve a compatible device driver by, for example, accessing one or more remote databases 110. Alternatively, device control application 116 may retrieve a compatible device driver by accessing software included in plug-ins 106 (e.g., device driver plug-ins 208). Further, in some embodiments, a device may communicate with the programmable data router 102 using more than one protocol, allowing the device to be discovered/identified by one existing device driver plug-in 208 and then fully exploited via another plug-in 106 that is retrieved by the device control application 116 at step 606.

Further, device control application 116 may retrieve a compatible device driver by accessing an element included in language plug-ins 206 to compile a third party program or to write a program locally. For example, the device control application 116 could obtain source code of a device driver and compiles the device driver for the device on which the programmable data router 102 is running. The device control application 116 could then install and use the device driver plug-in 208.

At step 608, having retrieved the necessary plug-in 106 to access the received network data, device control application 116 invokes the retrieved plug-in 106 to convert or translate the received network data into a format specified by the plug-in 106.

At step 610, device control application 116 performs an action associated with the received network data. In some embodiments, the action may include delivering the converted or translated network data to one or more devices or software entities that are subscribed to the device from which the network data was received. In some embodiments, the subscriber(s) include a remote subscriber (e.g., a database in the cloud), a local subscriber (e.g., a database local to the programmable data router 102), and/or a subscriber internal to the programmable data router 102 (e.g., an algorithm running inside a language plug-in 206). The method 600 then returns to step 602, where additional network data may be received.

Accordingly, in various embodiments, the programmable data router 102 implements one or more plug-ins 106 to convert received data to a canonical format in order to move values between devices or services that implement incompatible protocols. In some embodiments, the canonical format enables such devices and services to communicate and move values between one another in real-time. Further, converting received data into a canonical format may enable the programmable data router 102 to detect arbitrary conditions. Additionally, in various embodiments, the programmable data router 102 is able to manage and route live data streams (e.g., a video feed, audio feed, or other type of data feed) between two or more devices or services, without requiring the programmable data router 102 to understand the format(s) of the live data stream. In some embodiments, local networks (e.g., ad-hoc networks, local area networks (LANs), etc.) are utilized to provide low-latency communication between devices, enabling the devices to perform analysis and/or control operations without transmitting data to or receiving data from a remote network (e.g., a cloud-based network).

Figure 7:
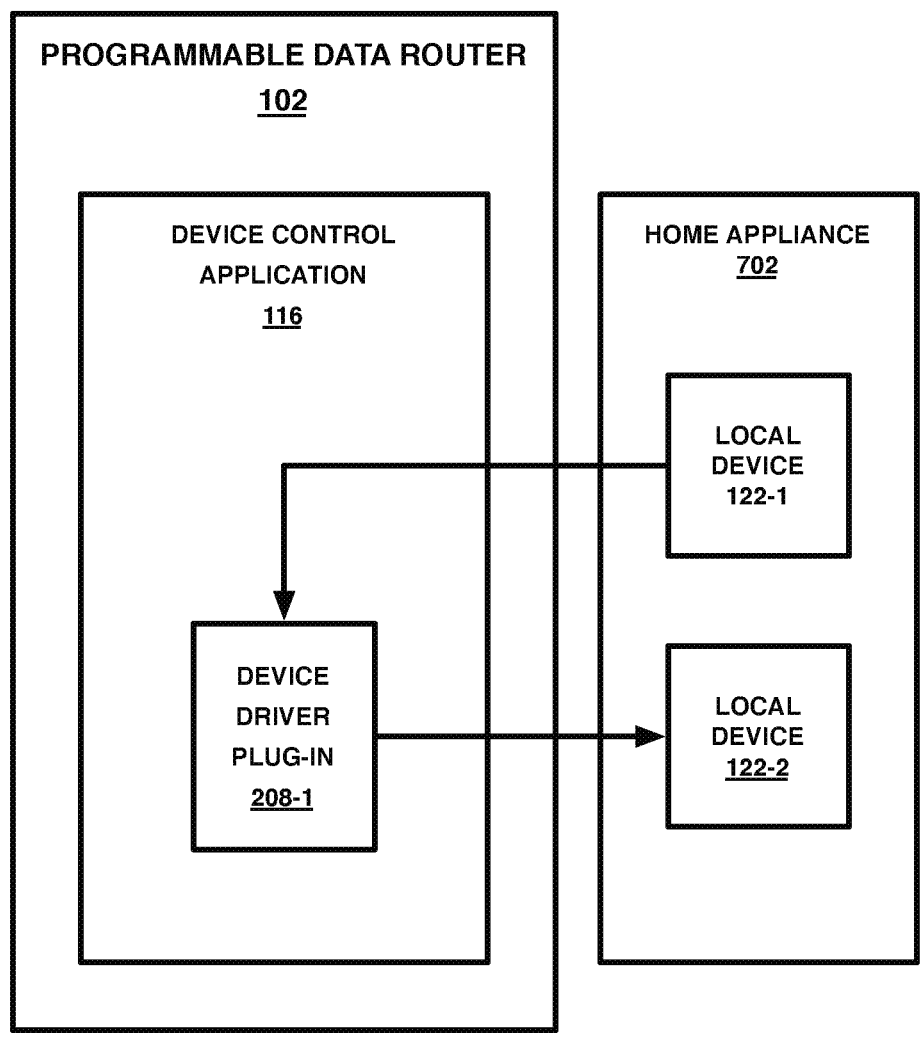
FIG. 7 is a block diagram illustrating integration of a home appliance, according to various embodiments of the present invention.

FIG. 7 is a block diagram illustrating integration of a home appliance 702, according to various embodiments of the present invention. As shown, device control application 116 includes device driver plug-in 208-1. Device control application 116 is in communication with local device 122-1 and local device 122-2 included in home appliance 702. In some embodiments, local device 122-1 is coupled to device driver plug-in 208-1, which, in turn, is coupled to local device 122-1.

In some embodiments, home appliance 702 may be a refrigerator. Local device 122-1 may be an after-market temperature measurement device (e.g., a digital thermometer, thermocouple, etc.) that is included in the refrigerator to add one or more capabilities, such as a remote temperature control and monitoring capability. Local device 122-2 may be a temperature controller, typically a compressor, within the refrigerator.

Local device 122-1 transmits network data (e.g., temperature data) to device control application 116 via network 120 and network interface 108. Network data may be in any technically feasible format suitable for digital or analog transmission. Device control application 116 receives network data from local device 122-1 and may modify the granularity of received data values and/or the rate at which the data values are sampled. In some embodiments, the programmable data router 102 could sample received data values at a high rate, process the received data values, and forwarding the received data to a second device when the received data exceeds a particular threshold, reducing the rate at which data is transmitted to the second device and giving a better temporal level of granularity (e.g., change of value). Alternatively, the programmable data router 102 could sample received data values at a low rate in order to miss small data variations that occur over short periods of time.

Local device 122-1 may provide temperature data with a step size that is smaller than the step size specified by a plug-in 106 implemented by the device control application 116 and/or local device 122-2. For example, local device 122-1 may provide temperature data in one-tenth degree steps, whereas plug-in 106 may specify that one degree accuracy is required to control local device 122-2. Accordingly, plug-in 106 may rescale the temperature data to one degree increments, for example, to conserve processing resources and/or to output the temperature in the step size expected by local device 122-2. In other embodiments, plug-in 106 may modify the precision of data (e.g., fixed-point or floating-point values to integer values), the units of the data (e.g., from Celsius to Fahrenheit), and/or the range of the data (e.g., by clipping the data based on a minimum value and/or maximum value).

Alternatively, local device 122-1 may provide temperature data in a continuous, analog format. Plug-in 106 may then define a step size to impose a specific granularity on the temperature data. Similar techniques can be performed on any other type of network data received by device control application 116.

Device control application 116 may then determine a response specified by plug-in 106 based on the received network data. In the above example of the refrigerator, the received network data is processed by plug-in 106 to determine the action(s) to be performed by a device, such as whether to turn on local device 122-2, to decrease a temperature value, or to turn off local device 122-2 to allow temperature to increase. Plug-in 106 would then cause the programmable data router 102 to output data associated with the action(s).

Plug-in 106 may further determine a threshold level at which to execute the action(s). In the above example, the threshold level may be a particular temperature set point at which to maintain the internal temperature of the refrigerator. Further, a threshold level may be a level at which plug-in 106 determines that the refrigerator is too warm and activates a warning signal or alarm.

Finally, plug-in 106 executes one or more actions in response to the network data exceeding the threshold level. In the above example, plug-in 106 would cause the programmable data router to transmit data to local device 122-2 to turn on local device 122-2 if temperature is above a threshold or to turn off local device 122-2 if the temperature is below the threshold.

The example of a refrigerator, described above, illustrates one embodiment of the control method. However, any embodiment in which network data is received, rescaled, and compared to a threshold to cause a response, is within the scope of the present invention. In the same or other embodiments, a response may be triggered, for example, when a value has changed with unexpected frequency over a specified period of time, when a value has not changed over a specified period of time, when a combination of readings of device parameters indicates an error condition, and/or when statistically anomalous readings have been received from a device. Other types of conditions also may be implemented by the programmable data router 102 and associated plug-ins 106 in various embodiments.

Other types of thresholds can include a pattern of events or a sequence of events. These patterns and/or sequences may occur over a specified period of time. In general, local processing of received data to detect when one or more thresholds have been reached or exceeded enables low-latency decisions to be made, such as in Internet of Things (IoT) contexts.

For example, in various embodiments, the programmable data router 102 may be configured to communicate with multiple devices and/or other programmable data routers 102 via an ad-hoc network, such as a group of people that are attending a concert or sporting event. In such an embodiment, each device (e.g., a smartphone) may include a programmable data router 102 that communicates with a cloud-based networking service (e.g., a social networking website). Analytics associated with the cloud-based networking service may determine which devices are present at the concert and may then transmit an invitation to the programmable data routers 102 included in the devices to create a coordinated, peer-to-peer (e.g., ad-hoc, Bluetooth®, Wifi direct, etc.) network over which data can be shared. In some embodiments, a coordinated network may be created to enable each of multiple users to display a single tile segment of a live video feed or image, enabling multiple devices—each of which includes an instance of the programmable data router 102—to produce one or more pixels of a larger, multi-device screen. Further, in such embodiments, the data received by the programmable data router 102 could include sound samples, and a plug-in 106 could determine whether various characteristics of the sound samples (e.g., frequency, amplitude, etc.) have reached or exceeded certain thresholds. Then, in response to determining that sound samples have reached or exceeded one or more thresholds, a the plug-in 106 could cause the devices to display images associated with the sound samples, enabling low-latency crowd interaction with a live event.

Although FIG. 7 illustrates that a single plug-in 106 receives network data and outputs control data, in other embodiments, device control application 116 implements a first plug-in to receive network data and a second plug-in to output response data. As described above in conjunction with FIG. 4, device control application 116 includes the capability to retrieve, via network interface 108, additional plug-ins that may be required to communicate with local devices 122 that provide network data.

Figure 8:
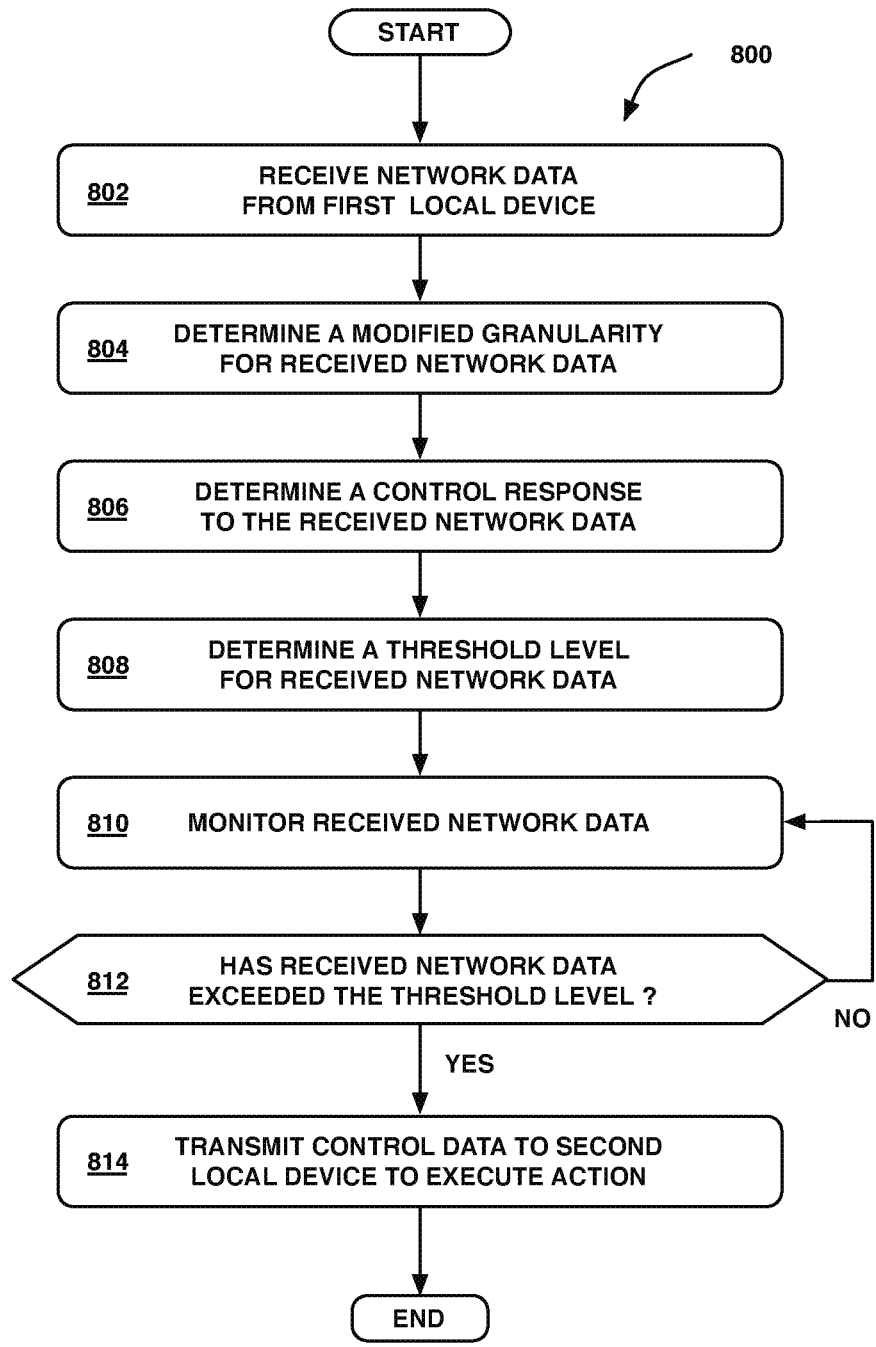
FIG. 8 is a flow diagram of method steps for monitoring and controlling a network device, according to various embodiments of the present invention.

FIG. 8 is a flow diagram of method steps for monitoring and controlling a network device, according to various embodiments of the present invention. Although the method steps are described in conjunction with the systems of FIGS. 1-7, persons skilled in the art will understand that any system configured to perform the method steps, in any order, is within the scope of the present invention.

As shown, a method 800 begins at step 802, where device control application 116 is executed by processor 114 to receive network data from a first local device 122-1. Although the method is illustrated above as a local device 122 in a home environment, the method 800 is equally applicable to a device included in remote devices 112 accessed via network 120. For example, a factory floor or assembly line may be controlled and/or monitored by a supervisor or manager via an instance of device control application 116 residing on a laptop computer or smartphone in the supervisor's office.

At step 804, device control application 116 retrieves a plug-in 106 to determine a modified granularity (e.g., temperature data granularity) associated with the received network data. In a factory environment, the level of granularity specified by a plug-in 106 may depend on the size and complexity of the commodity being manufactured. For example, granularity of a production line producing light bulbs may be measured in hundreds or thousands of units per hour, whereas granularity of an automobile engine assembly line may be measured in tens of units per day.

At step 806, device control application 116 determines a response to the received network data specified by plug-in 106. As described above with respect to the refrigerator control example of FIG. 7, plug-in 106 may respond to received temperature data by transmitting data to turn on a compressor. In a factory scenario, a response may include, for example, adjusting the speed of an assembly line based on the number of quality rejections, or varying a chemical concentration according to analysis of output product characteristics.

At step 808, device control application 116 determines a threshold level for received network data specified by plug-in 106. At step 810, device control application 116 and/or plug-in 106 monitor the received network data. At step 812, plug-in 106 determines whether received network data exceeds the threshold level. Again, as described above with respect to the refrigerator example of FIG. 7, a temperature threshold may be determined based on the temperature needed to keep the contents of the refrigerator. In the factory example, the threshold may be based on specifications of output product characteristics. If, at step 812, plug-in 106 determines that received network data does not exceed the threshold level, then the method 800 returns to step 810. If, at step 812, plug-in 106 determines that received network data exceeds the threshold level, then the method 800 proceeds to step 814.

At step 814, plug-in 106 transmits control data to a second local device 122 to execute one or more actions in response to the received network data. The method 800 then ends. In the example of a refrigerator, control data may depend on the refrigerator specification and may include a simple on-off signal or a drive signal directly to the compressor. In the first factory example described above, the control data may include a line speed control signal. In the second factory example described above, the control data may include a signal to increase chemical concentration or may include data that is associated with a valve state.

The method 800 set forth above is described with reference to a refrigerator and a factory production line. However, persons skilled in the art will understand that the method 800 may be implemented control any type of network device that outputs data associated with the status of the network device and receives data configured to control one or more parameters of the network device.

In sum, a system is configured to integrate multiple devices with different communications interface protocols into a common utility to monitor and control a particular environment. The elements may include commercial off-the-shelf (COTS) components, subsystems with proprietary interface specifications, controllers, transducers, virtual devices, network data streams, social media feeds, and the like. The system further includes utilities that facilitate expansion for components and subsystems that may become available with advancing technology and future developments. The system may be implemented on a handheld device, for example, without limitation, a smartphone, or on a laptop or desktop computer or workstation, or on any other platform capable of performing computer operations, such as a cloud-based networking service. The system provides a common interface that interprets and translates a multitude of different interface characteristics to allow seamless control of the particular environment. The particular environment may include, without limitation, a residence, apartment, office building, factory, or any other collection of elements in a physical or virtual location.

At least one advantage of the disclosed techniques is that a single utility is able to monitor and control an array of devices with different communications interface protocols and allows a user to specify desired behavior of a defined environment. Further, the utility may be deployed on a local platform, including a hand-held device, and may offload processor intensive activity to remote facilities via the internet, allowing increased processing power without requiring extensive local resources. Additionally, software running in a cloud-based networking service may communicate with and/or configure the programmable data router to perform analysis locally to reduce latency and more efficiently communicate with networked devices.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. One or more non-transitory computer-readable media storing instructions that, when executed by one or more processors, cause the one or more processors to manage a device network by performing steps of:
   determining that first data received from a first network device is associated with a first communications interface protocol;
   modifying the first data via a first software plug-in associated with the first communications interface protocol to generate first modified data, wherein modifying the first data comprises:
      converting, by the first software plug-in, the first data from a first format associated with the first communications interface protocol to a canonical format, and rescaling the first data from a first step size to a second step size specified by a second network device to generate the first modified data, wherein the first step size is different from the second step size; and performing a first operation associated with the second network device based on the first modified data, wherein the second network device is associated with a second communications interface protocol.

2. The one or more non-transitory computer-readable media of claim 1, the steps further comprising:

installing a second software plug-in associated with a third communications interface protocol;

determining that second data included in a remote database is associated with the third communications interface protocol; and acquiring the second data from the remote database via the second software plug-in.

3. The one or more non-transitory computer-readable media of claim 1, the steps further comprising:

receiving source code associated with the first network device;

compiling the source code to generate the first software plug-in; and installing the first software plug-in.

4. The one or more non-transitory computer-readable media of claim 1, the steps further comprising:

receiving second data associated with the first network device;

converting the second data via the first software plug-in by modifying at least one of a data format of the second data, a granularity of the second data, or a sampling rate of the second data to generate second modified data; and transmitting the second modified data to a third network device to alter a value of a physical parameter associated with the third network device.

5. The one or more non-transitory computer-readable media of claim 1, the steps further comprising:

modifying the first data via a second software plug-in associated with a third communications interface protocol to generate second modified data; and transmitting the second modified data to a third network device associated with the third communications interface protocol.

6. The one or more non-transitory computer-readable media of claim 1, wherein the first data is further converted to a format associated with the second communications interface protocol.

7. The one or more non-transitory computer-readable media of claim 1, wherein performing the first operation based on the first modified data comprises:

at least one of determining that the first modified data exceeds a threshold value or determining that the first modified data has changed by a specified value over a specified period of time; and in response, transmitting the first modified data to the second network device.

8. The one or more non-transitory computer-readable media of claim 1, wherein the second network device is subscribed to the first network device and is remote from the first network device.

9. The one or more non-transitory computer-readable media of claim 1, wherein the second network device is subscribed to the first network device and is local to the first network device.

10. A system for managing a device network, the system comprising:

a memory storing a device control application; and a processor coupled to the memory, wherein, when executed by the processor, the device control application configures the processor to:

determine that first data received from a first network device is associated with a first communications interface protocol, modify the first data via a first software plug-in associated with the first communications interface protocol to generate first modified data, wherein modifying the first data comprises:

converting, by the first software plug-in, the first data from a first format associated with the first communications interface protocol to a canonical format; and rescaling the first data from a first step size to a second step size specified by a second network device to generate the first modified data, wherein the first step size is different from the second step size, and perform a first operation associated with the second network device based on the first modified data, wherein the second network device is associated with a second communications interface protocol.

11. The system of claim 10, wherein the device control application further configures the processor to:

install a second software plug-in associated with a third communications interface protocol;

determine that second data included in a remote database is associated with the third communications interface protocol; and acquire the second data from the remote database via the second software plug-in.

12. The system of claim 10, wherein the device control application further configures the processor to:

receive source code associated with the first network device;

compile the source code to generate the first software plug-in; and install the first software plug-in.

13. The system of claim 10, wherein the device control application further configures the processor to:

receive second data associated with the first network device;

convert the second data via the first software plug-in by modifying at least one of a data format of the second data, a granularity of the second data, or a sampling rate of the second data to generate second modified data; and transmit the second modified data to a third network device to alter a value of a physical parameter associated with the third network device.

14. The system of claim 10, wherein the device control application further configures the processor to:

modify the first data via a second software plug-in associated with a third communications interface protocol to generate second modified data; and transmit the second modified data to a third network device associated with the third communications interface protocol.

15. The system of claim 10, wherein the first data is further converted to a format associated with the second communications interface protocol.

16. The system of claim 10, wherein performing the first operation based on the first modified data comprises:

at least one of determining that the first modified data exceeds a threshold value or determining that the first modified data has changed by a specified value over a specified period of time; and in response, transmitting the first modified data to the second network device.

17. A computer-implemented method for managing a device network, the method comprising:

determining that first data received from a first network device is associated with a first communications interface protocol;

modifying, via a processor, the first data via a first software plug-in associated with the first communications interface protocol to generate first modified data, wherein modifying the first data comprises:

converting, by the first software plug-in, the first data from a first format associated with the first communications interface protocol to a canonical format, and rescaling the first data from a first step size to a second step size specified by a second network device to generate the first modified data, wherein the first step size is different from the second step size; and performing a first operation associated with the second network device based on the first modified data, wherein the second network device is associated with a second communications interface protocol.

18. The computer-implemented method of claim 17, further comprising:

installing a second software plug-in associated with a third communications interface protocol;

determining that second data included in a remote database is associated with the third communications interface protocol; and acquiring the second data from the remote database via the second software plug-in.

* * * * *